United States Patent
Huang et al.

(10) Patent No.: US 7,090,458 B2
(45) Date of Patent: Aug. 15, 2006

(54) PLANAR PARALLEL ROBOT MECHANISM WITH TWO TRANSLATIONAL DEGREES OF FREEDOM

(75) Inventors: Tian Huang, Tianjin (CN); Meng Li, Tianjin (CN); Zhanxian Li, Tianjin (CN); Derek G. Chetwynd, Coventry (GB); David J. Whitehouse, Coventry (GB)

(73) Assignee: Tianjin University, Tianjin (CN)

( * ) Notice: Subject to any disclaimer, the term of this patent is extended or adjusted under 35 U.S.C. 154(b) by 16 days.

(21) Appl. No.: 10/500,588

(22) PCT Filed: Dec. 30, 2002

(86) PCT No.: PCT/GB02/05943

§ 371 (c)(1),
(2), (4) Date: Jun. 30, 2004

(87) PCT Pub. No.: WO03/055653

PCT Pub. Date: Jul. 10, 2003

(65) Prior Publication Data

US 2005/0092121 A1    May 5, 2005

(30) Foreign Application Priority Data

Dec. 31, 2001   (CN) .......................... 2001 0 145160

(51) Int. Cl.
*B25J 17/00* (2006.01)
*B25J 18/00* (2006.01)

(52) U.S. Cl. .......................... 414/735; 901/15; 901/28; 74/490.05

(58) Field of Classification Search ................ 414/735, 414/680; 901/28, 29, 15; 74/490.09, 490.01, 74/490.05, 490.06
See application file for complete search history.

(56) References Cited

U.S. PATENT DOCUMENTS 6,081,882 A     6/2000 Gossett

OTHER PUBLICATIONS

Cochrane P T et al: "Macroscopically Distinct Quantum-Superposition States As A Bosmic Code For Amplitude Damging" The American Physical Society, Physical Review A, vol. 59, No. 4, pp. 2631-2834, Apr. 1999.
Rieffel, Eleanor, et al. "An Introduction To Quantum Computing For Non-Physicists" http://arxiv.org/quant-ph-980916, pp. 1-45, Jan. 19, 200.
Zeilinger, Anton "Fundamentals Of Quantum Information" Phys. World U.K, Physics World, vol. 11, No. 3, pp. 35-40, Mar. 1998.

*Primary Examiner*—Donald W. Underwood
(74) *Attorney, Agent, or Firm*—Lathrop & Gage L.C.

(57) ABSTRACT

A linkage mechanism for a pick and place robot includes two rotatable drive members mounted on a base and connected to a platform by a respective two element linkage. The mid point of the two element linkage has a bell crank, the arms of which are connected to first and second location links anchored respectively at the base and platform. The platform may be configured to carry various implements, and the mechanism permits movement thereof in two dimensions by selective motion of the drive members.

10 Claims, 5 Drawing Sheets

PLANAR PARALLEL ROBOT MECHANISM WITH TWO TRANSLATIONAL DEGREES OF FREEDOM

BACKGROUND

1. Field of the Invention

The present invention relates to a translational parallel robot mechanism of the type typically referred to as a pick and place robot.

2. Description of the Related Art

Pick and place robot mechanisms are typically utilized in light industries, such as the electronics industry and packaging industries, where such robotic mechanisms are required for accurate repetitive performance of simple operations that occur many times over. Such an operation may, for example, involve the repeated picking up of items at a first location with a gripping mechanism, moving a gripped item to a second location, and releasing said item at the second location. The gripping mechanism is typically mounted to a movable platform.

In order to meet performance criteria that are typically required of a robot mechanism of this type, one requirement may be that the platform is moved at a relatively high speed with two degrees of freedom in a movement plane without altering the posture of platform. Optionally the mechanism as a whole may also move in a relatively slow or stepwise manner and in a direction normal to the movement plane of the platform. Conventional robotic arm assemblies have difficulty in meeting these requirements with precision of movement and may lack synchronicity of movement due to different drive mechanisms being in place to accomplish these goals.

SUMMARY

The present robotic mechanism overcomes the problems outlined above and advances the art by facilitating additional range of motion including at least two translational degrees of freedom in a mechanism that may be operated quickly and accurately.

In one embodiment, there is provided a mechanism that includes a base and a platform that is movable relative to the base in a plane extending through the base and platform. The base is provided with two rotatable drive members connected to the platform via respective linkages. Each linkage includes a drive link having a first end fixed for rotation with a respective drive member and a driven link having a first end that is pivotally connected to the platform. The respective second ends of the drive and driven links are pivotally connected together, wherein one of the linkages further includes a location means that is operable to maintain the platform in a predetermined orientation with respect to the base during movement thereof, the location means includes a bell crank that is provided at the pivotal connection between the drive and driven links, a first location link pivotally connected between one arm of the bell crank and the base, and a second location link pivotally connected between the other arm of the bell crank and the platform.

Such an arrangement permits the platform to be moved in two dimensions by selective rotation of the drive members, either in the same direction or in opposite directions, and to different extents, while maintaining the platform in a predetermined orientation.

The linkage having the location means may advantageously be provided with two spaced driven links mounted on common pivotal connections to the bell crank and platform respectively. It will be appreciated that the provision of twin driven links enhances the rigidity of the mechanism as a whole. Bracing means may be provided between the driven links. Such bracing means may comprise one or more members extending between the driven links. The members may extend substantially normal to the longitudinal direction of the links. Alternatively the members may extend diagonally between the links. The bracing means may preferably comprise a combination of both types of members.

In a preferred embodiment both linkages are provided with a location means having the configuration hereinbefore described.

The base may be arranged so as to be movable in a direction that is substantially normal to the movement plane of the platform. Such movement may be effected by the mounting of the base on an appropriate structure providing movement in a single degree of freedom, for example, as a linear drive mechanism.

The first location link extending between the bell crank and the base may be provided with a spherical connection means, such as ball joints or rose joints, at each end thereof. Spherical connection means may further be provided between the each end of the second location link and the bell crank and platform respectively. The connection between the or each driven link and the platform may also be effected by a spherical joint.

In a preferred embodiment, the drive and driven links are inboard of the location means. The drive links and the first location link(s) are preferably of equal length. The driven link(s) and second location link(s) are preferably of equal length. In the preferred embodiment one arm of each bell crank is longer than the other arm, and preferably the longer arm is connected to a respective driven link.

In one preferred embodiment, the axes of the drive members are parallel and perpendicular to the movement plane of the platform. The drive members may be driven by respective motors located on the same side of the linkage. A line passing through the axes of the drive members is preferably parallel to a line passing through said second ends, and preferably also to a line passing through said first ends of the driven links.

The axes of the drive members are preferably spaced apart by less than the length of a drive link.

In one preferred embodiment, the driven links are longer than the drive links.

BRIEF DESCRIPTION OF THE DRAWINGS

Embodiments of the present invention will now be described with reference to the accompanying drawings in which.

DETAILED DESCRIPTION

Figure 1:
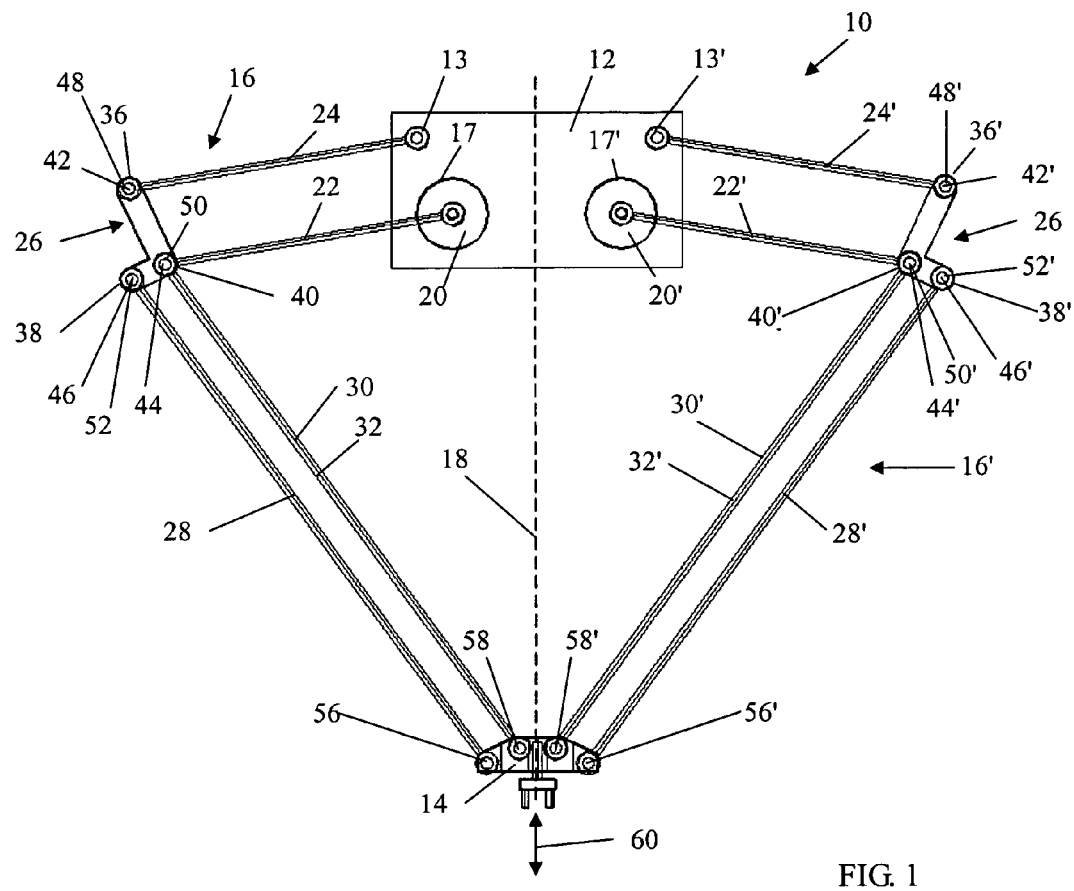
FIG. 1 shows an end view of a mechanism according to a first embodiment of the present invention, the mechanism being shown in a centralized position.
Figure 2:
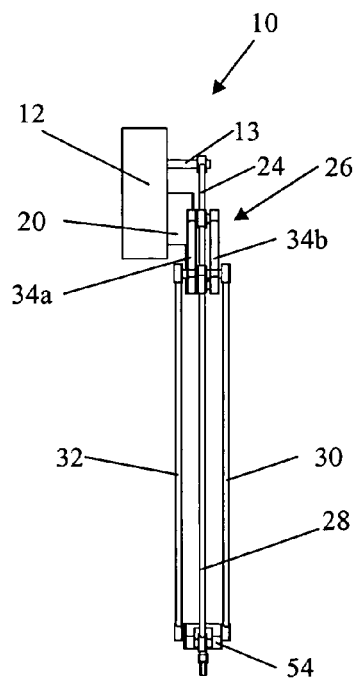
FIG. 2 shows a side view of the mechanism of FIG. 1.
Figure 3:
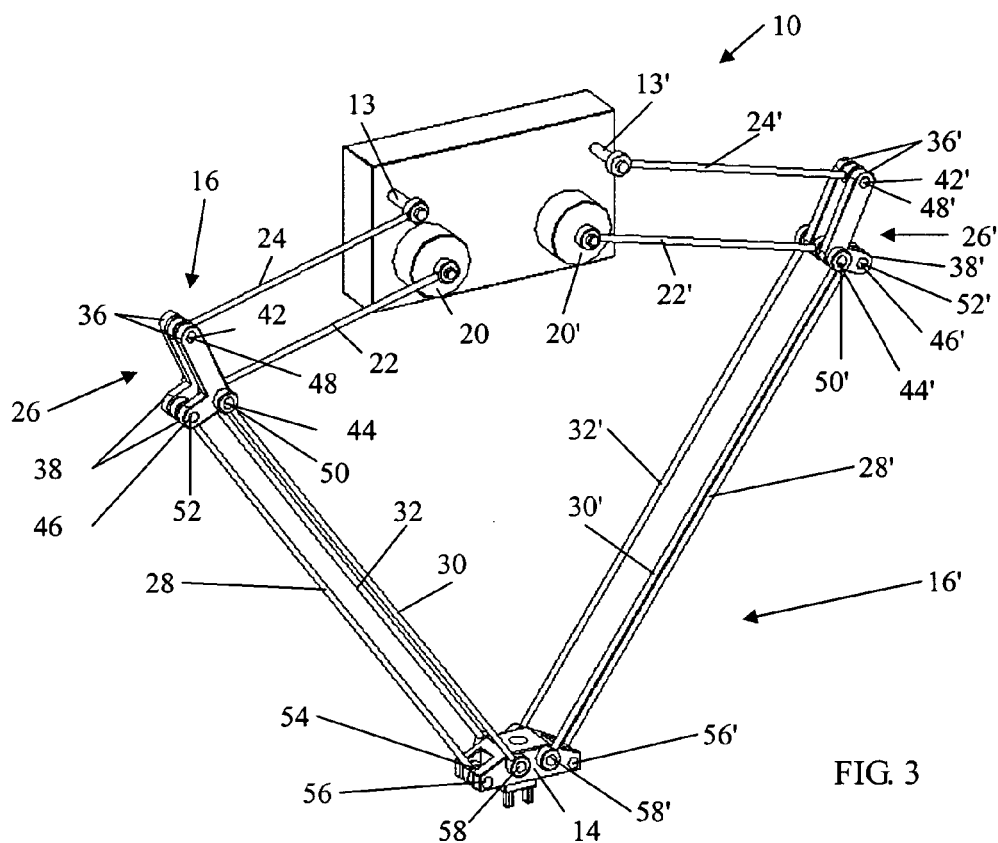
FIG. 3 shows a perspective view of the mechanism of FIG. 1.
Figure 5:
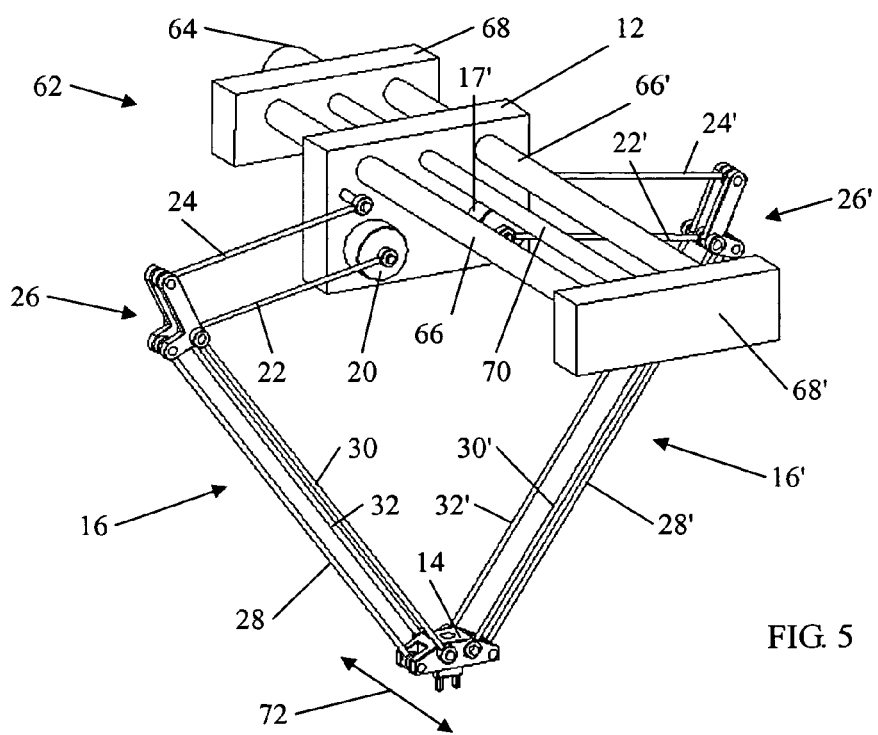
FIG. 5 shows a perspective view of the mechanism of FIG. 1 mounted on a traversing assembly.

Referring now to FIGS. 1 through 5, there is shown a mechanism generally designated 10. It will be noted that the centrally positioned mechanism 10 is symmetrical about a plane indicated by broken line 18 passing through both the base 12 and working element or platform, 14, as shown in FIG. 1. In the following discussion, the plane 18 forms a basis for mirror image where, for example, linkage arrangements 16 on the left side of FIG. 1 have identical counterparts on the right side designated as 16'. The mechanism 10 comprises a base 12, a movable platform 14 and two kinematic chains or linkage arrangements 16 (and 16') extending between the base 12 and the platform 14. The base 12 is provided with two rotatable drive shafts 20, 20' which are operable to move the platform 14 relative to the base 12 via the linkage arrangements 16, 16'. The drive shafts 20, 20' extend from an appropriate drive source, for example, synchronous servo motors 17, 17' mounted on the base 12. The platform 14 may be configured so as to accommodate a range of attachments 19 including, for example, a gripper, a sensor or a tool.

The linkage arrangement 16 includes a pair of upper links 22, 24 of equal length, a bell crank assembly 26 and three lower links 28, 30, 32 of equal length. It will be recognized by those skilled in the art that the links 22, 24, 28, 30, 32 and bell crank assembly 26 of each linkage arrangement 16 are arranged so as to provide upper and lower parallelogram linkages between the base 12 and the platform. The links 22, 24, 28, 30, 32, each are formed as elongate members, for example, having eyes at each end for connectivity. The upper links 22, 24 include a drive link 22 which is fixed for rotation with a drive shaft 20, and an upper location link 24 which is pivotally fixed to the base 12 via a pin 13. Each bell crank assembly 26 includes a spaced pair of substantially "L" shaped bell crank members 34 (shown as 34a and 34b in FIG. 2) each having a pair of legs 36, 38 extending from a common root 40. Through holes 42, 44, 46 are provided at the root 40 and at the end of each leg 36, 38 respectively. The through holes 42, 44, 46 accommodate pins 48, 50, 52 extending between the spaced bell crank members 34. The pins 48, 50, 52 enable ends of the links 22, 24, 28, 30, 32 to be pivotally connected to the bell crank assembly 26. As will be readily observed from the embodiment of FIG. 1 the upper links 22, 24 are connected to the bell crank assembly 26 between the bell crank members 34, with the drive link 22 being connected at the root 40 of the bell crank members 34 and the location link 24 connected to the end of one of the leg pairs 36.

The lower links 28, 30, 32 of each linkage arrangement 16 comprise a lower location link 28 and two driven links 30, 32. The location link 28 is pivotally connected between the other of the leg pairs 38 of the ball crank assembly 26 and a fork 54 of the platform 14. The location link 28 is pivotally connected to the fork 54 by a pin 56. The driven links 30, 32 extend from the root 40 of the bell crank 26 assembly to the platform 14. It will be noted that the driven links 30, 32 are provided outboard of the bell crank assembly 26 and, hence, may be mounted on a common pin 50 to the drive link 22. The inner links 30, 32 are further mounted on a common pin 58 to the platform 14.

Figure 4A:
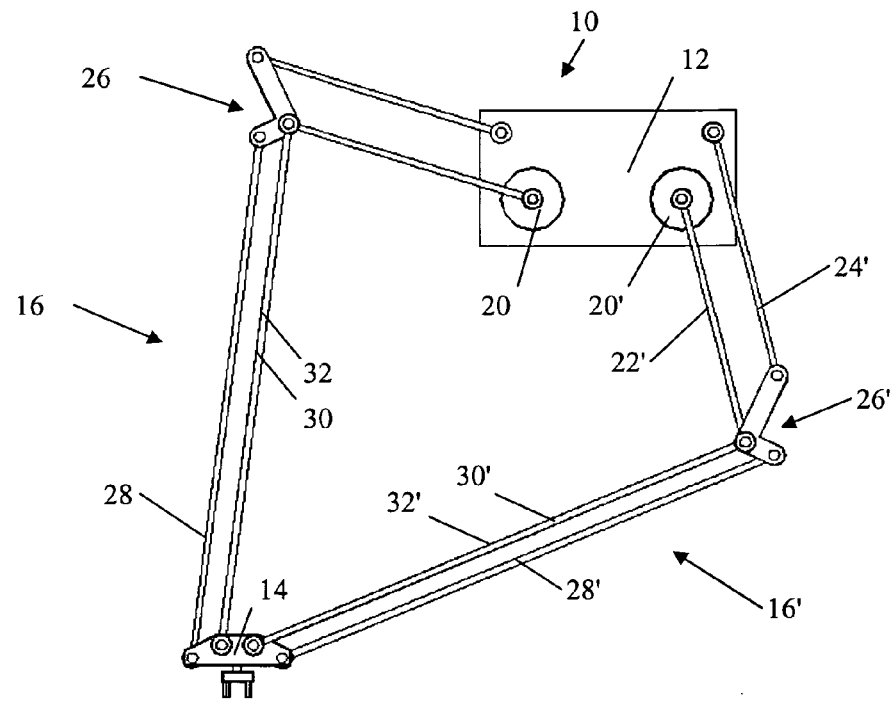
FIGS. 4*a* and 4*b* show an end view of the mechanism of FIG. 1, the mechanism being shown in opposite laterally displaced positions.
Figure 4B:
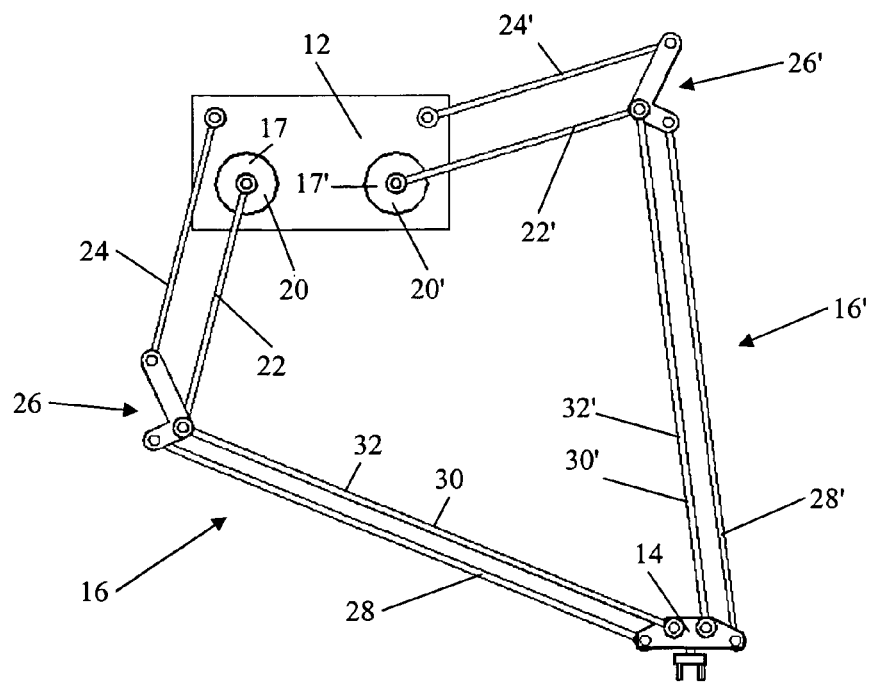

Movement of the platform 14 relative to the base 12 is achieved by rotation of the drive shafts 20 and drive links 22. Rotation of the drive shafts 20 in opposite directions causes the platform 14 to be moved either towards or away from the base 12 as indicated by arrow 60 on FIG. 1. Rotation of the drive shafts 20 in the same direction causes the platform 14 to be moved laterally with respect to the base as shown in FIGS. 4a and 4b. It will thus be appreciated that the platform 14 has 2 degrees of freedom within a rotational plane passing through the base 12 and platform 14. This motion is achieved with two drive shafts 20, 20' having only a single degree of freedom, i.e. rotation. The linkage arrangements 16 imbue the mechanism 10 with both static and dynamic stiffness, especially in the direction normal to the aforementioned plane of motion.

In the above described embodiment of the mechanism 10, the various pivotal connections are achieved by pins and eyes of the links. It has been found however that certain of these pivotal connections may be replaced by spherical joints without affecting the operation of the mechanism 10. In particular the respective connections of the upper location link 24 to the base 12 and bell crank assembly 26, the lower location link 28 to the bell crank assembly 26 and the platform 14, and the connection of driven links 30,32 to the platform 14, e.g., at joint 19, may comprise spherical joints. The use of such spherical joints enables the elimination of reaction forces due to misalignment, for example due to wear or manufacturing tolerances, without adversely affecting the stiffness and mobility of the mechanism 10 as a whole.

The mechanism 10 may further be arranged so as to be movable in a direction normal to that of the plane of motion of the platform 14. This may be effected by the mounting of the base 12 to a movement device such as a single degree of freedom linear drive 62. The linear drive 62 comprises a motor 64, guide members 66, end plates 68 and a lead screw 70. The guide members 66 extend between the end plates 68 and through apertures of the base 12. The lead screw 70 is rotatable by the motor and passes through a captive nut provided in the base 12. It will be understood that rotation of the screw 70 causes the base 12, and hence the mechanism 10 as a whole, to move along the guide embers as indicated by arrow 72. It will be appreciated that other movement devices know in the art may be utilized to move the mechanism 10. The mechanism may, for example, be fitted to a traveller which is movable by interaction with a driven endless belt.

Figures 6, 7:
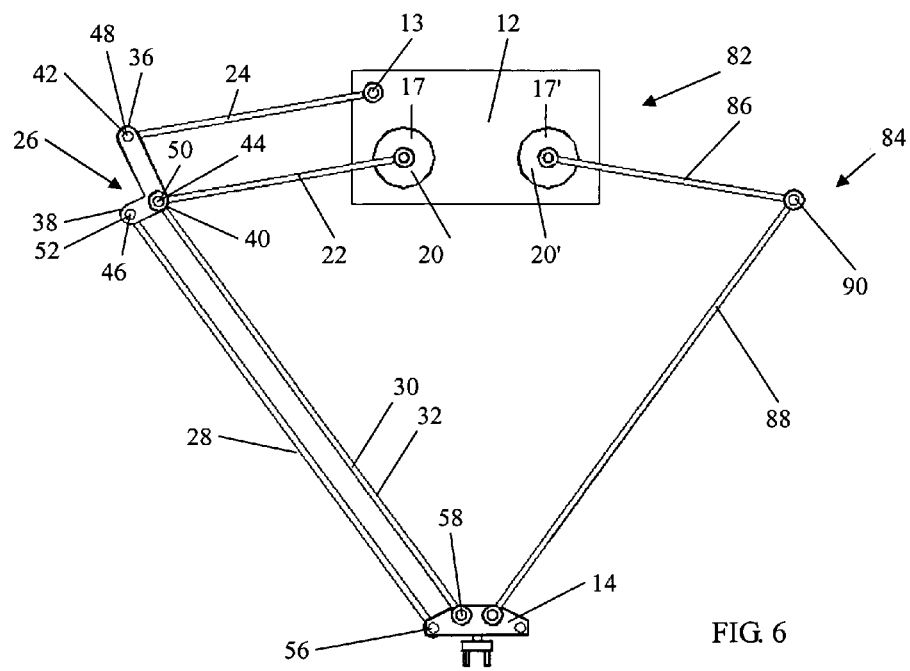
FIG. 6 shows an end view of a mechanism according to a second embodiment of the present invention.
FIG. 7 shows a perspective view of a mechanism according to a third embodiment of the present invention.
Figure 8:
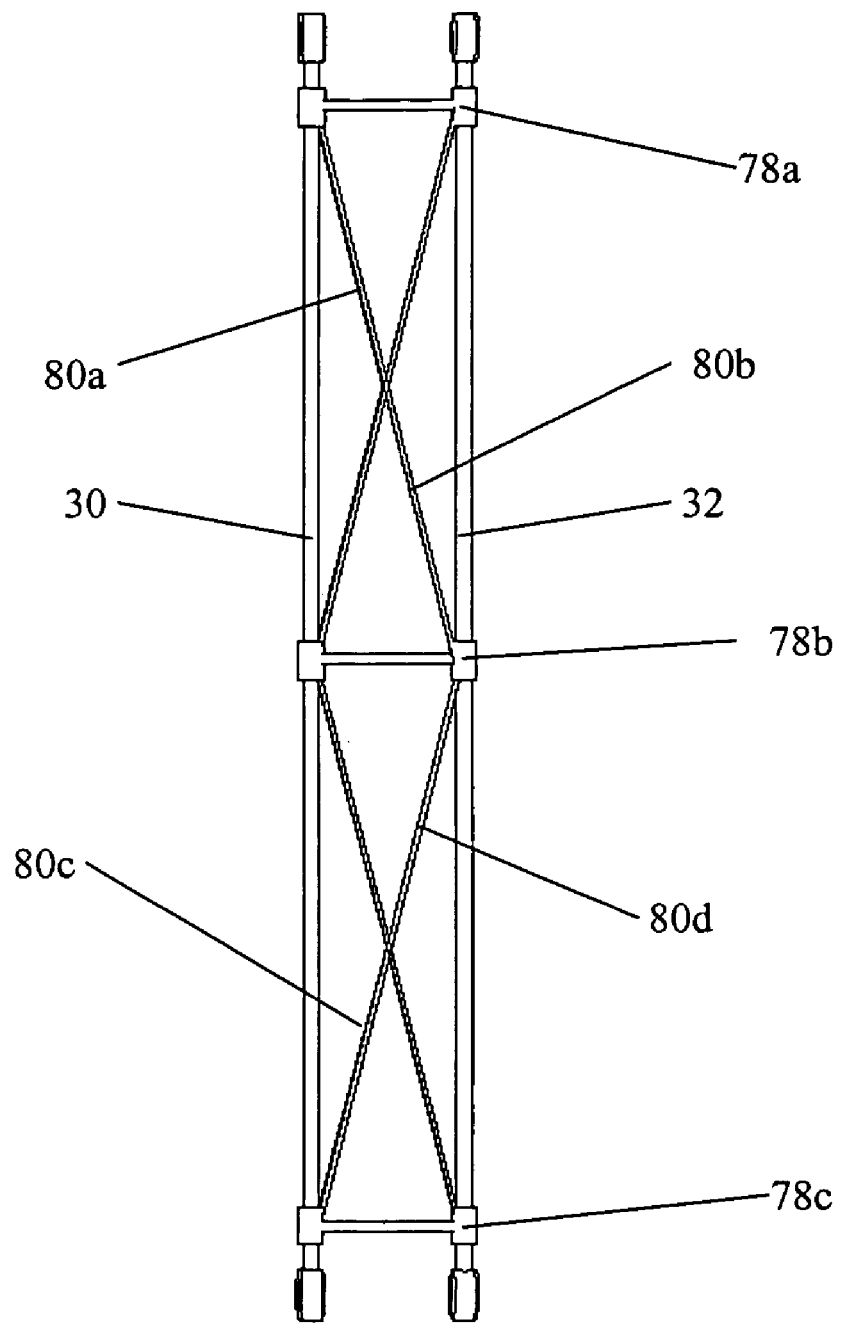
FIG. 8 shows a plan view of a linkage of the mechanism of FIG. 7.

Referring now to FIGS. 7 and 8 there is shown a second embodiment of a mechanism according to the present invention and generally designated 74. The mechanism 74 is for the most part similar to that described with reference to FIGS. 1 to 5 and hence common features are identified with like reference numerals. The mechanism 74 of FIGS. 7 and 8 differs from that of FIGS. 1 to 5 in that bracing means 76 are provided between the driven links 30, 32. The bracing means 76 include transverse brace members 78 (for example, brace members 78a, 78b and 78c as shown in FIG. 8) and diagonal brace members 80 (for example, brace members 80a, 80b, 80c and 80d as shown in FIG. 8). In the embodiment shown there are provided three transverse members 78 positioned respectively at each end and midway between the driven links 30, 32, and four diagonal members 80 provided in two pairs. It will be understood that other arrangements of the bracing members 78, 80 are possible. The inclusion of the bracing members 78, 80 has been found to increase the static and dynamic stiffness of the mechanism normal to the motion plane of the platform 14 with little overall increase in the weight of the mechanism 74.

In the aforementioned embodiments the mechanisms 10, 74 have each been provided with pairs of inner lower links 30, 32. It will be appreciated that a mechanism in accordance with the present invention may be provided with a single inner lower link on each side and still function effectively. The use of two inner lower links is preferred however for the structural rigidity it imparts to the mechanism as a whole.

Referring finally to FIG. 6 there is shown a third embodiment of a mechanism according to the present invention generally designated 82. As before, features common to the previously described embodiments are identified with like reference numerals. The mechanism 82 differs from those previously described in that it is provided on one side with a linkage arrangement 16 of the previously described type and on the other side with a simplified linkage arrangement 84. The simplified arrangement 84 comprises a drive link 86 fixed for rotation with a drive shaft 20 and a driven link 88 pivotally connected to the platform 14. The drive and driven links 86, 88 are joined by a common pinned link or hinge 90. It will be readily understood that the more complicated linkage arrangement 16 maintains the required orientation of the platform 12 relative to the base 12, while the simplified linkage arrangement 84 enables motive forces from the drive shaft 20 with which it is associated to be applied to the platform 14.

What is claimed is:

1. A mechanism comprising:
   a base;
   a platform that is movable relative to the base in a plane extending through the base and the platform;
   the base being provided with two rotatable drive members connected to the platform via a pair of linkages,
   each linkage including a drive link having a first end fixed for rotation with a respective drive member and a driven link having a first end pivotally connected to the platform,
   and respective second ends of the drive and driven links being pivotally connected together,
   one of said linkages further including means for locating the platform relative to the base and for maintaining the platform in a predetermined orientation with respect to the base during movement thereof,
   wherein the means for locating includes a bell crank provided at a pivotal connection between the drive and driven links, a first location link pivotally connected between one arm of the bell crank and the base, and a second location link pivotally connected between the other arm of the bell crank and the platform.

2. The mechanism according to claim 1 comprising two spaced driven links mounted on common pivotal connections to the bell crank and the platform respectively, the links being spaced perpendicularly with respect to the plane.

3. The mechanism according to claim 2 wherein structural braces are provided between the spaced driven links.

4. The mechanism according to claim 1, wherein the first location link is provided with a spherical connection at each end thereof.

5. The mechanism according to claim 1, wherein the second location link has a spherical connection at each end thereof.

6. The mechanism according to claim 1, wherein the connection between the driven links and the platform is a spherical connection.

7. The mechanism according to claim 1, wherein the driven links are longer than the drive links.

8. The mechanism according claim 1, wherein the location means is outboard of the drive link and the driven link.

9. The mechanism according to claim 1, each linkage of the pair of linkages is provided with the location means.

10. The mechanism according to claim 1, wherein the base is movable in a direction substantially normal to the plane by a linear drive mechanism.

* * * * *